(No Model.) 2 Sheets—Sheet 2.

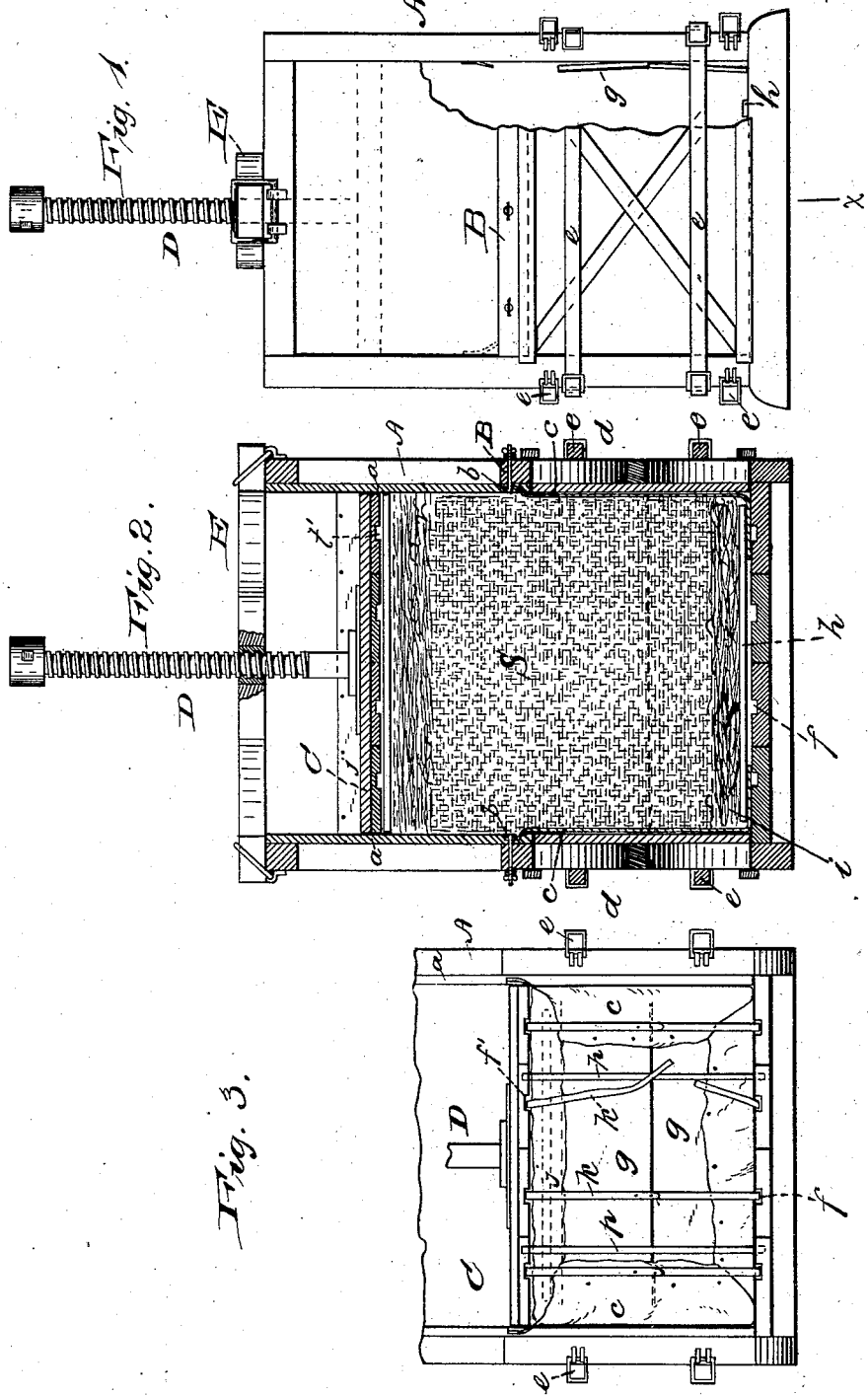

O. ANKETELL.

PROCESS OF AND APPARATUS FOR BALING BRAN.

No. 293,699. Patented Feb. 19, 1884.

Attest:
Chas. P. Hill
J. F. Campbell

Inventor:
Oliver Anketell,
by Drake & Co., Att'ys.

UNITED STATES PATENT OFFICE.

OLIVER ANKETELL, OF NEWARK, NEW JERSEY, ASSIGNOR OF ONE-HALF TO ANDREW ALLBRIGHT, OF SAME PLACE.

PROCESS OF AND APPARATUS FOR BALING BRAN.

SPECIFICATION forming part of Letters Patent No. 293,699, dated February 19, 1884.

Application filed December 1, 1883. (No model.)

*To all whom it may concern:*

Be it known that I, OLIVER ANKETELL, a citizen of the United States, residing at Newark, in the county of Essex and State of New Jersey, have invented certain new and useful Improvements in the Process of and Apparatus for Baling Bran; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide an improved method of preparing bran for transportation, so as to render it more easily handled, to occupy less space, and to preserve the bran clean and free from deleterious substances liable to impair the quality of the same.

The invention is further intended to provide an improved device whereby the bran may be compressed to the required dimension and covered and prepared for transportation.

The invention consists in the construction, arrangement, and operation of the various parts of the apparatus, and in the manner of arranging the bran and other materials within said apparatus, and of covering the same.

Figure 4:
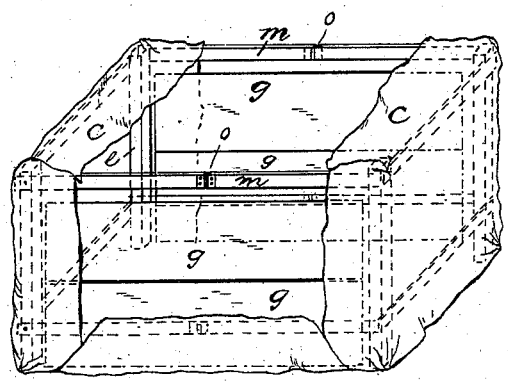
Figure 5:
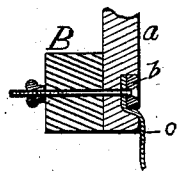

Referring to the accompanying drawings, comprised in two sheets, Figure 1, Sheet 1, is a side elevation, partly broken away, of a press illustrating my invention. Fig. 2 is a vertical section through line $x$ of Fig. 1. Fig. 3 is a front elevation of the lower portion of Fig. 1, with the doors removed, showing the bale nearly completed; and Fig. 4 is a perspective view of the frame, around which part of the bale-covering is adjusted before being placed within the press, said view also showing the bale-covering so adjusted, part of the frame being indicated by dotted lines; and Fig. 5 is an enlarged sectional view of the device for holding the canvas in place.

The press used in my process is illustrated in the drawings, and consists of the uprights A and suitable cross-pieces, B. The upper portion of the press is permanently boarded, the inner surface of which is smooth, so as not to offer any resistance to the follower or compressing-cover C—a single one being employed, instead of two, as are used in some complicated presses—which moves vertically with the same.

D is a screw, which is secured to the follower C, and passes through the removable cross-piece or dog E, which rests upon the top of the press, and is held in position by the pivoted iron bands $d'$, through which the ends of the dog E pass, as shown in Figs. 1 and 2.

Near the bottom of the side boards, $a$, which extend down to about the middle of the press, is a groove, in which is fitted an iron strip, $b$, extending the length of the side boards, and is secured by bolts $b'$ to the frame. This strip serves to hold the canvas $c$ in place, Figs. 2 and 5, which covers the ends of the bale. Said canvas reaches the bottom of the press, as in Fig. 2, and covers the ends and part of the four sides of the bale, as shown in Fig. 3.

$g$ are boards, which form the front and back of the bale. (Shown in Figs. 1 and 3.) Said boards may be placed in the press and supported by tacking the canvas $c$ thereto, as indicated in Fig. 3.

The lower portion of the press, on the four sides, is not permanently boarded, but is provided with removable sides or doors $d$, for convenience in adjusting, covering, and removing the bale.

Braces $e$, Figs. 1, 2, 3, the ends of which are secured by iron loops $e'$, pivoted to the frame-work, are employed to hold the doors firmly in place. The bottom or floor boards of the press and the under side of the follower C are provided with grooves $f f'$, extending the entire length of said boards from the front of the press to the back.

Fig. 4, Sheet 2, shows a frame composed of uprights $l$ and cross-pieces $m$ $n$, the pieces $m$ being hinged at $o$, around which the side and end covering of the bale is arranged. The whole covering and frame is then placed in the press and the canvas $c$ secured behind the strips $b$. The frame is then shut by means of the hinges $o$ and taken out of the press. This method of arranging and adjusting the covering is preferred, instead of adjusting said parts within the press. After the covering is placed within the press, iron bars $p$, Fig. 3, are then arranged against the boards g, two or more at the front and back of the bale, the ends of said bars being secured or resting in slots in the press, from which they can be lifted when desirable. Said bars serve to keep the boards upright and from spreading when the bran is compressed.

The method of arranging the materials within the press and of compressing and covering the same is as follows: The covering, canvas ends, and board sides having been placed in the press, as described, several pieces or strips of wood, h, are laid on the bottom of the press and straw i spread upon them. This forms the bottom covering of the bale. The doors are now put in and the bran s, Fig. 2, poured into the press at the top of sufficient quantity to form the bale. Straw is then laid upon the bran and several strips of wood placed upon the straw. Strips of canvas j, Fig. 2, are lightly tacked to the inside of the press near the top, which, when the follower descends, are carried down with it and are designed to cover the joint between the upper edges of the board sides of the bale and the straw, as shown in Fig. 3, the canvas for the lower edges having been tacked in place before the doors are adjusted, as shown in same figure at the bottom. The follower and dog are then placed upon the press and fastened by the iron bands or loops and the power applied to the screw. After enough power has been applied to reduce the bran to the required dimensions, the doors, front and back, are removed, and metallic strips or bands k are inserted through the grooves f and drawn tightly around the bale, and secured as shown in Fig. 3. The follower is then raised, relieving the bale of its pressure, and the spring and elasticity of the compressed bran tighten the bands k still more, so that there is no possibility of the bran escaping. The side doors, d, are then removed and the bale taken out of the press, and is ready for transportation.

Metallic strips r, Fig. 1, are secured to the boards a at the front and back, to guide the bran into the covering. The advantage of providing four doors to the press, instead of two, as heretofore employed, is that it facilitates greatly adjusting, covering, and removing the bale from the press.

By covering the sides, as described, the hook used in handling the bales will not injure the covering, which would occur if the bale were covered entirely with canvas.

The bale, when completed, consists of a compressed central body of bran with canvas-covered ends, boarded sides, and straw confined by wooden strips on the top and bottom, and the whole securely bound by iron bands; but this feature—i. e., the kind and arrangement of the covering of the bale itself—is reserved for a future application, and is introduced here to more fully illustrate the invention sought to be protected in this application.

The press may be operated by hand, steam, or hydraulic power, or in any other practical manner.

If desirable, grooves may be made at right angles to the grooves f in the bottom boards of the press and under side of the follower, so that bands may be bound around the bale endwise in order to furnish additional security.

Having thus described my invention, what I claim, and wish to secure by Letters Patent, is—

1. The process herein described of preparing bran for transportation—to wit, of arranging the end, side, and bottom covering of the bale within a suitable press before pouring in the bran, of pouring in the bran and placing the material to form the top covering upon the same, of compressing the whole to the required dimensions, and securing the covering of the bale while under pressure.

2. A bran-press having removable doors on each of the four sides thereof, and a single movable follower, C, actuated by suitable mechanism.

3. In combination, a press, the upper portion of which is boarded, and provided with four doors in the lower portion thereof, a single follower or compressing-cover, C, a screw, D, and removable dog E.

4. In combination, a press provided with four doors, and having grooves f in the floor thereof, and a compressing-cover or follower, C, having grooves f' therein, all substantially as set forth.

5. In combination, a press provided with four doors, and having grooves f in the floor thereof, a compressing-cover, C, having grooves f' therein, and means for holding the canvas c in position while the bran is being compressed.

6. In combination, a press provided with four doors, and having grooves f in the floor thereof, a compressing-cover, C, having grooves f' therein, an iron strip, b, secured by bolts to the frame, and the canvas c, all substantially as and for the purposes herein set forth.

7. In a press for baling bran, the combination of a grooved compressing-cover, C, screw D, and an adjustable dog, E.

8. In combination with a bran-press, a frame composed of uprights e and hinged cross-pieces, for the purpose set forth.

In testimony that I claim the foregoing I have hereunto set my hand this 19th day of November, 1883.

OLIVER ANKETELL.

Witnesses:
F. F. CAMPBELL,
CHARLES H. PELL.